US012512615B2

(12) United States Patent
Blankinship et al.

(10) Patent No.: US 12,512,615 B2
(45) Date of Patent: Dec. 30, 2025

(54) PIN CONNECTOR

(71) Applicant: J.S.T. Corporation, Farmington Hills, MI (US)

(72) Inventors: Eric Blankinship, Lathrup Village, MI (US); Ping Chen, Novi, MI (US); Gwendolyn Upson, Ypsilanti, MI (US)

(73) Assignee: J.S.T. Corporation, Farmington Hills, MI (US)

( * ) Notice: Subject to any disclaimer, the term of this patent is extended or adjusted under 35 U.S.C. 154(b) by 321 days.

(21) Appl. No.: 18/140,962

(22) Filed: Apr. 28, 2023

(65) Prior Publication Data

US 2024/0364033 A1 Oct. 31, 2024

(51) Int. Cl.

*H01R 13/04* (2006.01)
*H01R 13/40* (2006.01)
*H01R 13/627* (2006.01)
*H01R 107/00* (2006.01)

(52) U.S. Cl.

CPC ............. *H01R 13/04* (2013.01); *H01R 13/40* (2013.01); *H01R 13/6272* (2013.01); *H01R 2107/00* (2013.01)

(58) Field of Classification Search

None

See application file for complete search history.

(56) References Cited

U.S. PATENT DOCUMENTS 5,439,385 A * 8/1995 Sakai .................. H01R 12/712 439/83
5,490,786 A * 2/1996 Mosquera .......... H01R 43/0256 439/83
5,609,490 A * 3/1997 Beesch .................. H01R 12/57 29/843
5,971,775 A * 10/1999 Tor ..................... H01R 12/7023 439/79
7,309,243 B2 * 12/2007 Yamagami ............. H01R 4/024 439/83
7,534,115 B2 5/2009 Murano et al.
7,704,101 B2 4/2010 Nagata et al.
9,711,901 B2 7/2017 Scholeno
10,594,060 B2 * 3/2020 Miyamura ............. H01R 13/41
2004/0023531 A1 * 2/2004 Wu ........................ H01R 13/40 439/79
2005/0164531 A1 * 7/2005 Wong .................. H01R 12/724 439/79
2006/0121780 A1 6/2006 Nakano
2020/0136285 A1 4/2020 Kitajima
2022/0085529 A1 3/2022 Karita et al.
2022/0094089 A1 3/2022 Takasaki et al.

FOREIGN PATENT DOCUMENTS

CN 107735910 A 2/2018

OTHER PUBLICATIONS

European Application No. 24172560.5, Partial European Search Report mailed Oct. 9, 2024; 3 pages.

* cited by examiner

*Primary Examiner* — Tho D Ta

(74) *Attorney, Agent, or Firm* — Sterne, Kessler, Goldstein & Fox P.L.L.C.

(57) ABSTRACT

An electrical connector is provided. The electrical connector can be a low profile, high voltage connector that can include a male housing and a female housing. The male housing can support male pins that mate with terminals disposed through the female housing. The bend or outward extension of the pins can support forming one row or dual rows of solder pads.

18 Claims, 13 Drawing Sheets

PIN CONNECTOR

FIELD

The present disclosure relates to connectors. In particular, aspects relate to electrical connectors having male pin contacts.

BACKGROUND

Electrical connectors can be used in various wiring systems. Electrical connectors can include a locking mechanism to maintain coupling between a female housing and a male housing. The female housing can support one or more terminals for mating with one or more male pins supported by the male housing. A terminal position assurance member can be used to assure proper installation and positioning of the terminals in the female housing. The terminal position assurance member can be locked in a position for assuring terminal positioning. Terminal position assurance members can be inserted into the female housing, and a portion of the terminal position assurance member can extend outside of the female housing.

SUMMARY

Some aspects are directed to a connector having a male housing comprising a rear side, a plurality of first openings and a plurality of second openings formed in the rear side, a plurality of pins, and a female housing comprising a plurality of terminals to mate with the plurality of the pin. The plurality of second openings are positioned below and offset from the plurality of first openings. The plurality of pins has a plurality of first pins disposed in the plurality of first openings, each of the plurality of first pins having a pin length, and a plurality of second pins disposed in the plurality of second openings, each of the plurality of second pins having the pin length.

In some aspects, the plurality of first pins are at a first angle relative to the rear side, and the plurality of second pins are at a second angle relative to the rear side. The second angle is greater than the first angle.

In some aspects, the plurality of second pins is outward of the plurality of first pins relative to the rear side.

In some aspects, the plurality of first openings is positioned above a central lateral axis of the rear side.

In some aspects, the plurality of second openings is positioned below a central lateral axis of the rear side.

In some aspects, a clearance or creepage for an electrical path extending from a first terminal of the plurality of terminals to a second terminal of the plurality of terminals is approximately 0.6 millimeters.

Some aspects are directed to a male housing for a connector having a bottom end having a transverse axis, a rear side, a first opening formed in the rear side, a second opening formed in the rear side and positioned below the first opening, a first pin, and a second pin. The first pin has a first end and a second end, the first end of the first pin being disposed in the first opening and the second end of the first pin extending along a first axis parallel to and on the same plane as the transverse axis. The second pin has a first end and a second end, the first end of the second pin being disposed in the second opening and the second end of the second pin extending along a second axis parallel to and on the same plane as the transverse axis, the second end of the first pin and the second end of the second pin being aligned relative to the rear side.

In some aspects, the first pin has an intermediate portion between the first end and the second end of the first pin, and the intermediate portion is aligned with the rear side.

In some aspects, the second pin has an intermediate portion between the first end and the second end of the second pin, and the intermediate portion is aligned with the rear side.

In some aspects, the first pin has a first pin length and the second pin has a second pin length that is less than the first pin length.

In some aspects, the first opening is positioned above a central lateral axis of the rear side, and the second opening is positioned below the central lateral axis.

In some aspects, the first end of the first pin extends along a third axis parallel to the transverse axis, and the first end of the second pin extends along a fourth axis parallel to the transverse axis.

Some aspects are directed to a male housing for a connector having a bottom end having a transverse axis, a rear side, a first opening formed in the rear side, a second opening formed in the rear side, a first pin, and a second pin. The first pin has a first end extending along a first axis, an intermediate portion, and a second end, and the intermediate portion of the first pin is at a first angle relative to the first axis. The second pin has a first end extending along a second axis, an intermediate portion, and a second end, and the intermediate portion of the second pin is at a second angle relative to the second axis. The second angle is different from the first angle.

In some aspects, the first pin and the second pin have the same pin length.

In some aspects, the second angle is greater than the first angle.

In some aspects, the second end of the second pin is outward of the second end of the first pin relative to the rear side.

In some aspects, the second end of the first pin and the second end of the second pin extend along axes parallel to and on the same plane as a bottom transverse axis of the male housing.

In some aspects, the second end of the first pin extends along a third axis, and the intermediate portion of the first pin is at a third angle relative to the third axis. The first angle and the third angle are the same.

In some aspects, the second opening is positioned adjacent the first opening.

In some aspects, the first opening is positioned above a central lateral axis of the rear side, and the second opening is positioned below the central lateral axis of the rear side.

BRIEF DESCRIPTION OF THE DRAWINGS/FIGURES

The accompanying drawings, which are incorporated herein and form part of the specification, illustrate aspects and, together with the description, further serve to explain the principles of the aspects and to enable a person skilled in the relevant art(s) to make and use the aspects.

Figure 1:
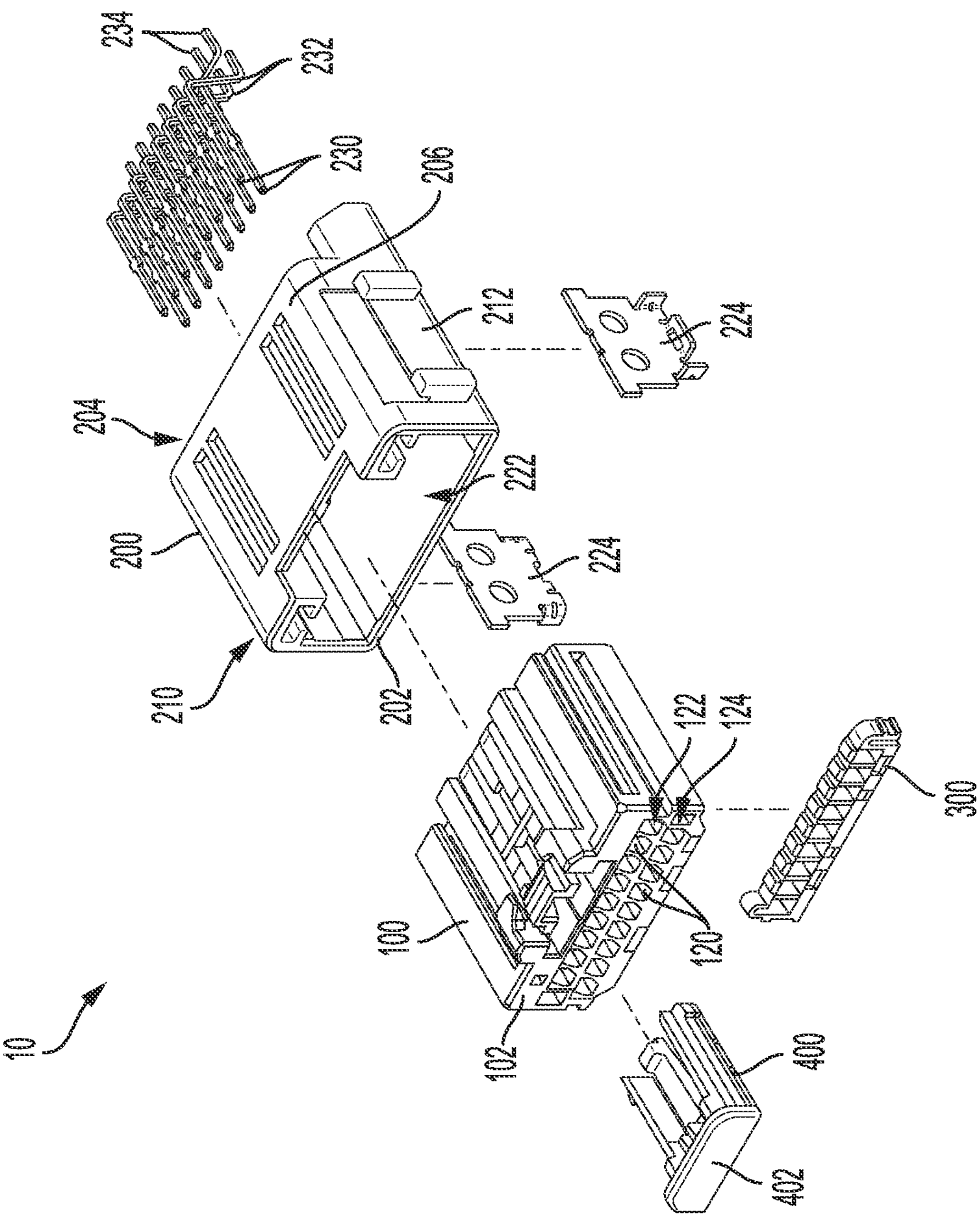
FIG. 1 is an assembly view of a connector according to various aspects.

The features and advantages of the aspects will become more apparent from the detail description set forth below when taken in conjunction with the drawings, in which like reference characters identify corresponding elements throughout. In the drawings like reference numbers generally indicate identical, functionally similar, and/or structurally similar elements.

DETAILED DESCRIPTION

The present invention(s) will now be described in detail with reference to aspects thereof as illustrated in the accompanying drawings. References to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The following examples are illustrative, but not limiting, of the present aspects. Other suitable modifications and adaptations of the variety of conditions and parameters normally encountered in the field, and which would be apparent to those skilled in the art, are within the spirit and scope of the disclosure.

As used herein, the term "approximately" is inclusive of the number to which it refers and includes numbers that bound and are within a range of 5%, 10%, 15%, or 20% except where such number would exceed 100% of a possible value.

Aspects provide an electrical connector for wiring systems, such as a vehicle wiring system. The electrical connector described herein can be a single or dual row, low profile, high voltage connector. In some aspects, the connector can have a low profile. As described herein, the connector can support two rows of terminals, which can mate with male pins. The connector can secure to a printed circuit board (PCB), or can be a wire to wire connector, for example.

The electrical connector can include a female housing, a male housing, a connector position assurance member ("CPA member"), and a terminal position assurance member ("TPA member"). The female housing, the CPA member, and the TPA member can form an assembly that can be coupled to the male housing.

The CPA member can ensure position assurance. Position assurance is important in wiring systems to ensure and maintain terminal mating and resist disconnection. To ensure coupling, a higher force can be required to couple the assembly with the male housing. The coupling can be intentionally released for maintenance by overcoming the resistance to disconnection. The CPA member can be released to allow decoupling of the female housing and male housing. Advantageously, feedback (e.g., a visual, tactile, and/or auditory feedback) can be provided to signal that the connector housings are coupled with position assurance. The coupling with connector position assurance between the assembly and the male housing can move the electrical connector from a pre-mate position to a fully mated position.

The TPA member can maintain proper terminal positioning within the housings. Terminal segments containing wire terminals can include a primary lock to maintain their position in a housing, ensuring proper mating. In an aspect, a portion of the TPA member can extend outside the female housing. In an aspect, the TPA member can reinforce the primary lock. In another aspect, a TPA member can be a secondary lock. Advantageously, feedback (e.g., visual, tactile, and/or audible feedback) can be provided to signal that the TPA member is in a final lock position so that a terminal can be installed with terminal position assurance. In the final lock position, the TPA member can be fully within the female housing. Once the terminal segments are installed, the TPA member can be in a final lock position in which the TPA member can be in blocking engagement with the terminal segments to prevent the terminal segments from being unintentionally removed from the female housing.

As described herein, the assembly including the female housing and the CPA member can be pre-installed. Accordingly, a user does not have to couple the CPA member to the female housing. In addition, the pre-installed assembly can help to prevent components from being detached and/or misplaced. To support connector position assurance when coupling the assembly to the male housing, the assembly can be prevented from being taken apart. In this way, the CPA member can be prevented from being decoupled from the female housing which can damage the assembly. It is desirable when the male housing and female housing are coupled in the fully mated position to have a high resistance to decoupling. High resistance to decoupling is desirable to prevent the male housing and female housing from returning to the pre-mate position. As such, decoupling from the fully mated position can require overcoming a specified resistance that is greater than the resistance to coupling to the fully mated position.

The TPA member can also be pre-installed in the assembly. Accordingly, a user does not have to couple the TPA member to the female housing. The TPA member can be in a pre-lock position prior to being moved into a position to provide terminal position assurance. In the pre-lock position, a portion of the TPA member can extend outwardly from the bottom of the female housing. In other aspects, the TPA member can be inserted from another side of the female housing, e.g., the front or the rear. In a final lock position, the TPA member can provide terminal position assurance. The TPA member can move to the final lock position where it can be fully within the female housing.

The male housing can include a front side and a rear side. An aperture for receiving the female housing and TPA member assembly can extend from the front to a portion between the front and the rear. The female housing can include a front, a rear, a bottom, and a top. One or more terminal apertures can extend intermediate to a first side and a second side opposing the first side of the female housing. The terminal apertures can extend from the front to the rear of the female housing to receive one or more terminal segments. Another aperture can extend from the bottom to a portion between the bottom and the top of the female housing to receive the TPA member. In this way, the electrical connector can support a TPA member that is inserted in a direction alternative to the direction of coupling between the female housing and the male housing. The aperture in which the TPA member is disposed can intersect the terminal apertures such that the TPA member can support the terminal segments disposed in the terminal apertures. In another aspect, the electrical connector can support a TPA member that is inserted in the direction of coupling.

In an aspect, the terminal segments can be inserted through the female housing terminal apertures in the pre-lock position. However, the TPA member can be prevented from moving to the final lock position if one or more terminal segments are partially mated. In an aspect, the terminal segments can block the TPA member from being moved to the final lock position if the terminal segments are only partially mated. Thus, in an aspect, for the TPA member to move to the final lock position, the terminal segments must be fully installed. When the terminal segments are fully installed, the terminal segments do not block the TPA member from moving to the final lock position. Accordingly, the terminal segments can be installed while the TPA member is in the pre-lock position. Once the terminal segments are installed, the TPA member can be moved to the final lock position. In an aspect, the terminal segments can be prevented from being inserted through the female housing terminal apertures if the TPA member is in the final lock position.

The terminal apertures can be arranged in one or more rows. In some aspects, the terminal apertures can be arranged in two rows. As described herein, a first row and a second row of terminal apertures can be provided, the second row being below the first row. In some aspects, the connector can be a single or dual row, low profile, row connector that supports two rows of terminals. In some aspects, the rows of terminal apertures can be aligned such that terminal apertures are arranged in parallel. In some aspects, the rows of terminal apertures can be offset. In some aspects, the first row of terminal apertures can begin at a different distance from the first side of the female housing than the second row of terminal apertures.

The rear side of the male housing can include a plurality of openings through which a plurality of pins are disposed. Accordingly, the pins extend into the aperture that receives the female housing. The pins can correspond to the terminal apertures in the female housing. In this way, when the female housing and male housing are coupled, the pins of the male housing can be aligned with the terminal apertures of the female housing. Terminals supported by the terminal aperture can therefore mate with the pins as the female housing and the male housing are mated.

In some aspects, the connector can be a single or dual row, low profile, connector. Accordingly, the arrangement of the male pins can support forming a single or dual row of solder pads.

In some aspects, the connector can support two rows of terminal apertures and two rows of corresponding pins. In other aspects, the connector can support more than two of terminal apertures and corresponding pins. As described herein, a first row and a second row of pins can be provided, the second row being below the first row. In some aspects, the rows of pins can be offset. In some aspects, the first row of pins can begin at a different distance from the first side of the male housing than the second row of pins. In some aspects, the first row of pins can begin at a different distance from the second side of the male housing than the second row of pins. The offset rows can allow for different pin arrangements.

In some aspects, the pins can be at least partially parallel to a PCB. Each pin can include a first end, an intermediate portion, and a second end. The first end and second end of each pin can be generally parallel to the top and bottom of the male housing. The first end of each pin can be disposed in the rear side of the male housing. The second end of each pin can be outside of the male housing. In some aspects, the first row pins can be the same length as the second row pins. Accordingly, the second ends of the second row pins being below the first row pins can extend further outwardly from the rear side of the male housing. In other words, the second ends of the second row pins can be outward from the second ends of the first row pins relative to the rear side of the male housing. In an aspect, the second row pins can be oblique at their intermediate portions. In an aspect, the first row pins can be at a first angle relative to the rear side, and the second row pins can be at a second angle relative to the rear side, the second angle being greater than the first angle.

In some aspects, the second end of each pin can be aligned relative to the rear side of the male housing. Accordingly, for the first row pins and the second row pins to be aligned at their second ends, the first row pins and the second row pins can be different lengths, in some aspects. In an aspect, the second row pins can be smaller in length than the first row pins.

In some aspects, the connector can be a high voltage connector that supports 18 or 21 pins, for example. In some aspects, the overall size of the electrical connector can be reduced such that the connector has a low profile. For example, generally parallel rows of terminals can allow for a reduced female housing size to limit the connector profile. In addition, orienting the terminals such that they are generally parallel to the top end and the bottom end of the female housing can support the electrical connector having a low profile. The arrangement of the terminals can also support a larger clearance or creepage. For example, a clearance or creepage for an electrical path extending from a first terminal of the plurality of terminals to a second terminal of the plurality of terminals can be approximately 0.6 millimeters.

A connector 10 is shown in FIG. 1. Connector 10 can include a female housing 100, a male housing 200, a TPA member 300, and a CPA member 400. Female housing 100, TPA member 300, and CPA member 400 can form a pre-installed assembly. In the pre-installed assembly, TPA member 300 can be partially disposed in female housing 100 such that TPA member 300 can be in a pre-lock position. Male housing 200 can include an aperture 222 to receive the pre-installed assembly. As shown, male housing 200 can include a front side 202, a rear side 204, a top end 206 a bottom end 208, a first side 210, and a second side 212. Aperture 222 can extend through front side 202 to a portion of male housing 200 between front side 202 and rear side 204. Top end 206, bottom end 208, first side 210, and second side 212 can enclose aperture 222 along with rear side 204.

Figure 2:
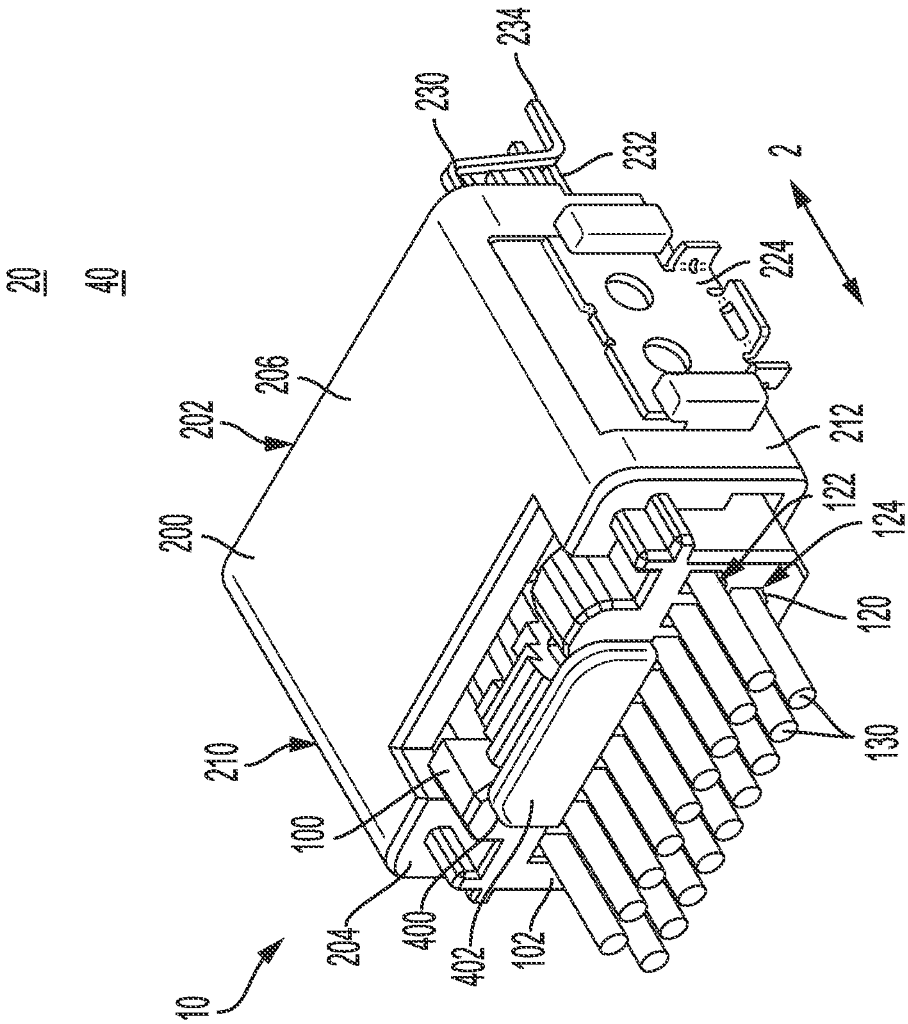
FIG. 2 is a perspective view of a connector according to various aspects.

With reference to FIGS. 1-2, aperture 222 can receive female housing 100 to mate one or more terminals 130 disposed in female housing 100 and one or more pins 230 disposed in male housing 200. Coupling CPA member 400 such that a front wall 402 of CPA member and a front 102 of female housing are aligned once female housing 100 is received by male housing 200 can provide position assurance. Coupling CPA member 400 in this way can move connector 10 from a pre-mate position to a fully mated position 40 (e.g., the female housing and the male housing are coupled to have a high resistance to decoupling). In an aspect, male housing 200 can receive the pre-installed assembly when TPA member 300 is in a final lock position 20 to couple male housing 200 to female housing 100. TPA member 300 can be entirely disposed within female housing 100 to move TPA member 300 from the pre-lock position to final lock position 20 after terminals 130 are inserted into female housing 100.

TPA member 300 in final lock position 20 and connector 10 in fully mated position 40 are shown in FIG. 2. As shown, female housing 100 can include one or more terminal apertures 120 to receive terminals 130. Terminal apertures 120 can extend from a front 102 of female housing 100 along an axis generally parallel to a transverse axis 2 to a portion of female housing 100 between front 102 and a rear 104 of female housing 100.

In some aspects, terminal apertures 120 can be disposed between first side 106 and second side 110 of female housing 100 along front 102. In some aspects, female housing 100 can include a plurality of terminal apertures 120. The plurality of terminal apertures 120 can be arranged in one or more rows. As shown in FIG. 2, female housing 100 can include a first row 122 of terminal apertures 120 and a second row 124 of terminal apertures 120 positioned below first row 122 to receive terminals 130.

Figure 3:
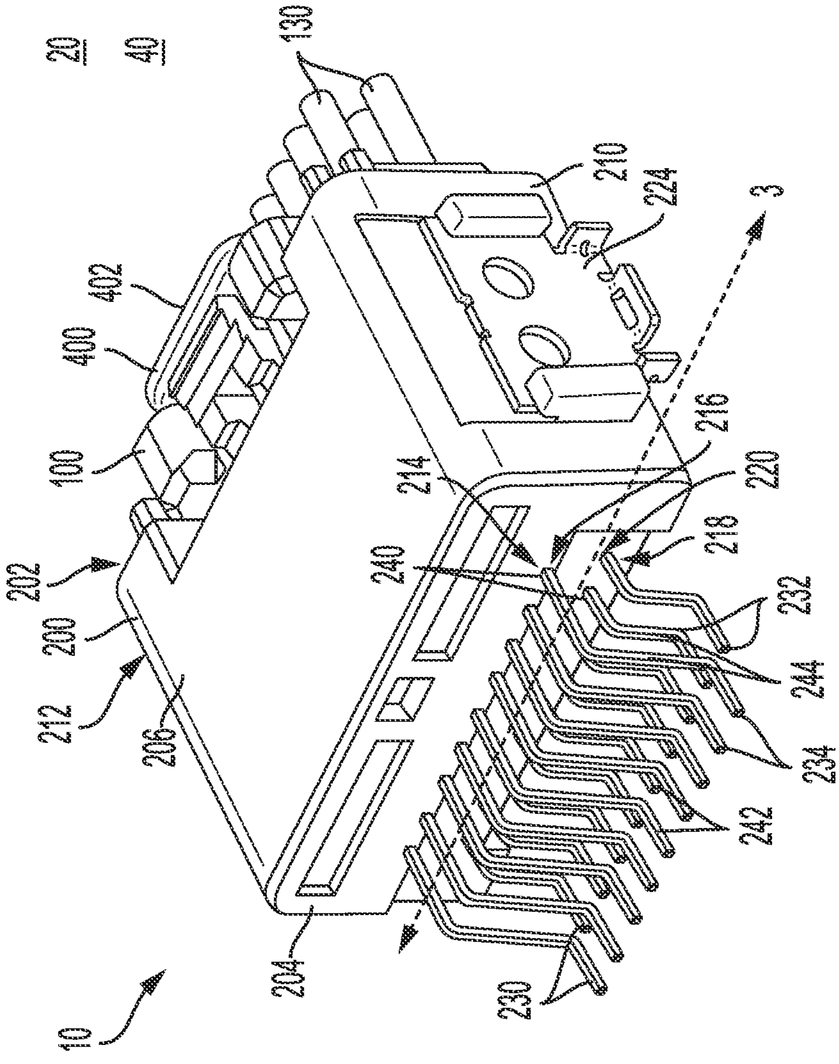
FIG. 3 is a perspective view of the connector of FIG. 2.

Aperture 222 of male housing 200 can receive the pre-installed assembly of female housing 100, TPA member 300 (FIG. 1), and CPA member 400 such that terminals 130 extend through male housing 200. As shown, male housing 200 can include one or more pins 230 and reinforcement tabs 224. Reinforcement tabs 224 can attach the male housing to a PCB, for example. With reference to FIG. 3, male housing 200 can include approximately 18 pins 230, in an aspect. In another aspect, male housing 200 can include 21 pins 230.

As shown in FIG. 3, rear side 204 male housing 200 can include one or more first openings 214 and one or more second openings 218. First openings 214 can be arranged in a first row 216 and second openings 218 can be arranged in a second row 220.

In some aspects, second openings 218 can be positioned below first openings 214. Accordingly, second row 220 of second openings 218 can be positioned below first row 216 of first openings 214. In some aspects, first openings 214 can be positioned above a central lateral axis 3 of rear side 204 of male housing 200. Accordingly, first row 216 of first openings 214 can be positioned above central lateral axis 3. In some aspects, second openings 218 can be positioned below central lateral axis 3. Accordingly, second row 220 of second openings 218 can be positioned below central lateral axis 3.

In some aspects, second row 220 of second openings 218 can be aligned with first row 216 of first openings 214. In some aspects, second row 220 of second openings 218 can be offset from first row 216 of first openings 214. First row 216 of first openings 214 and second row 220 of second openings 218 can be formed in rear side 204.

In some aspects, first row 216 of first openings 214 and second row 220 of second openings 218 can receive pins 230. Pins 230 can include one or more first pins 232 and one or more second pins 234. First pins 232 can be disposed in first openings 214 and second pins 234 can be disposed in second openings 218. Accordingly, first pins 232 can be arranged in a first row 236 that can coincide with first row 216 of first openings 214. Similarly, second pins 234 can be arranged in a second row 238 that can coincide with second row 220 of second openings 218. Pins 230 can be disposed in male housing 200 to mate with terminals 130.

Figure 4:
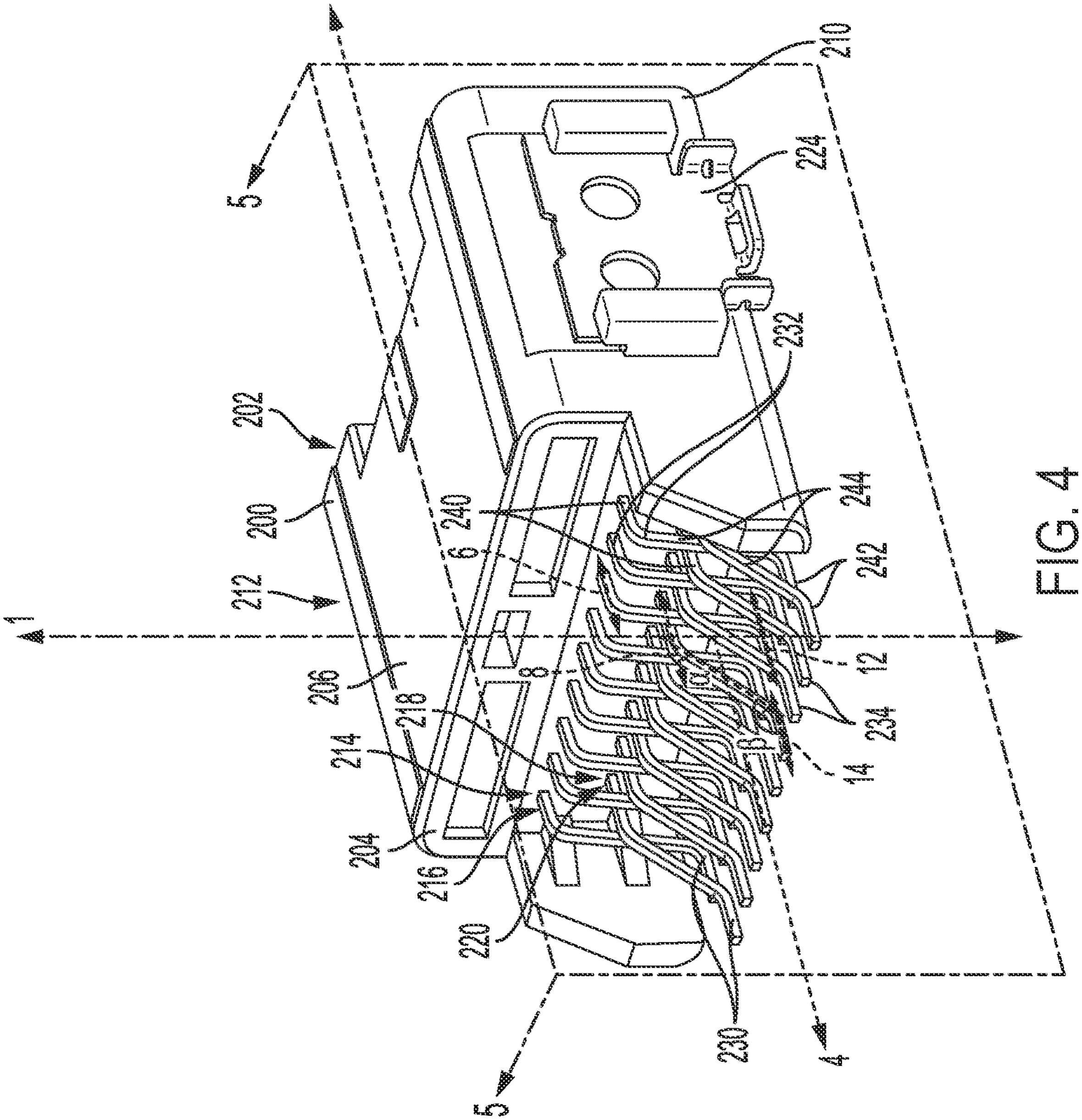
FIG. 4 is a perspective view of the male housing of the connector of FIG. 1.

With reference to FIG. 4, in some aspects, one or more pins 230 can extend from the housing at an oblique angle. In other words, at least a portion of one or more pins 230 can be at a non-perpendicular angle relative to rear side 204 of male housing 200. In some aspects, second pins 234 can be at an angle relative to rear side 204 that is greater than another angle at which first pins 232 can be relative to rear side 204.

In some aspects, pins 230 can be at least partially parallel to a PCB. In some aspects, pins 230 can each include a first end 240, a second end 242, and an intermediate portion 244 disposed between first end 240 and second end 242. As shown in FIG. 4, first end 240 of each pin 230 can be disposed through rear side 204 of male housing 200. First end 240 of each first pin 232 can be disposed in a first opening 214. Similarly, first end 240 of each second pin 234 can be disposed in a second opening 218.

As shown, bottom end 208 can include a transverse axis 4. Transverse axis 4 can be parallel to a PCB. In some aspects, first end 240 of each first pin 232 can extend along a first end axis 6 parallel to transverse axis 4. In some aspects, second end 242 of each first pin 232 can extend along a second end axis 12 parallel to transverse axis 4. In some aspects, second end axis 12 of second end 242 of each first pin 232 can be parallel to and on the same plane as transverse axis 4.

In some aspects, first end 240 of each second pin 234 can extend along a first end axis 8 parallel to transverse axis 4. In some aspects, second end 242 of each second pin 234 can extend along a second end axis 14 parallel to transverse axis 4. In some aspects, second end axis 14 of second end 242 of each first pin 234 can be parallel to and on the same plane as transverse axis 4.

In some aspects, intermediate portion 244 of one or more pins 230 can be generally straight. In other words, intermediate portion 244 of one or more pins 230 can be approximately perpendicular to first end 240 and second end 242 of the one or more pins 230, such as in FIG. 3. In some aspects, intermediate portion 244 of each pin 230 can be oblique. In other words, intermediate portion 244 of one or more pins 230 can be at a non-perpendicular angle relative to first end 240 and second end 242 of the one or more pins 230.

Figure 5:
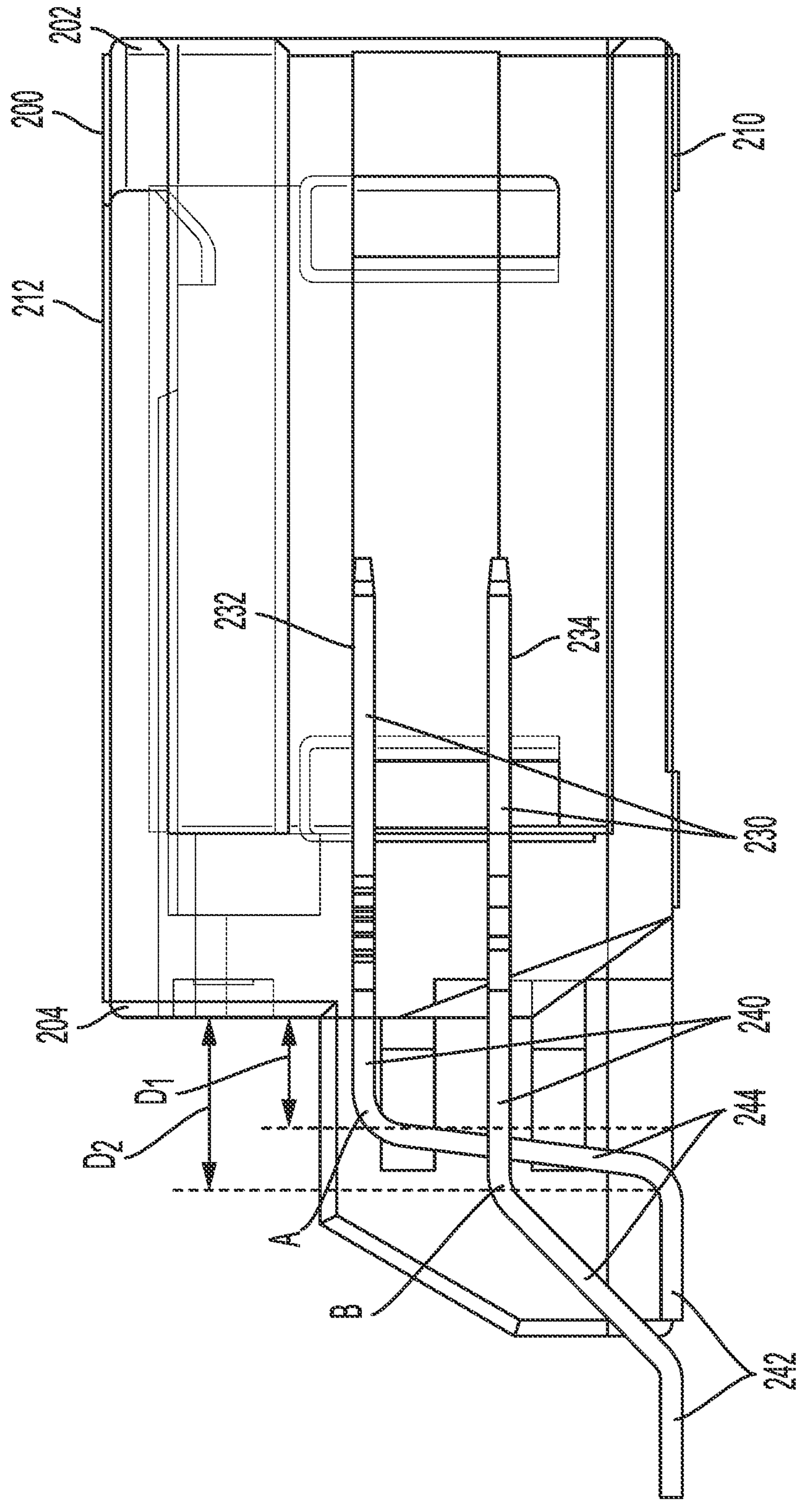
FIG. 5 is a side cross-sectional view of the male housing of FIG. 4 along plane 5-5.

As shown in FIG. 5, in some aspects, each intermediate portion 244 of second pin 234 can be oblique to a greater extent than each intermediate portion 244 of first pin 232. In some aspects, each first pin 232 can be bent at a point A, which can be a transition between first end 240 and intermediate portion 244 of each first pin 232. Point A can be at a first distance D1 from rear side 204 of male housing 200. In some aspects, each second pin 234 can be bent at a point B, which can be a transition between first end 240 and intermediate portion 244 of each second pin 234. Point B can be at a second distance D2 from rear side 204. In some aspects, second distance D2 can be greater than first distance D1.

In some aspects, second end 242 of each first pin 232 can be outward of second end 242 of each second pin 234 relative to rear side 204. With reference to FIG. 5, in some aspects, second end 242 of each second pin 234 can be outward of second end 242 of each first pin 232 relative to rear side 204. In some aspects, the outward extension of second end 242 of each second pin 234 can support forming a dual row of solder pads.

Figure 6:
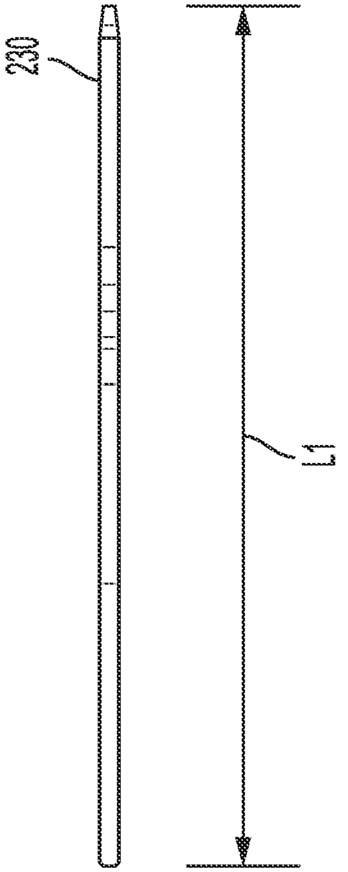
FIG. 6 is a side view of a pin of the male housing of the connector of FIG. 1.
Figure 7:
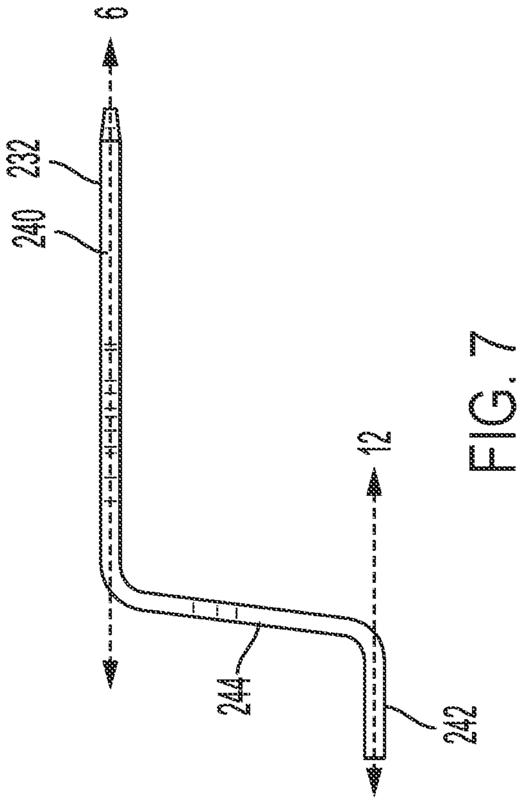
FIG. 7 is a side view of a pin of the male housing of the connector of FIG. 1.
Figure 8:
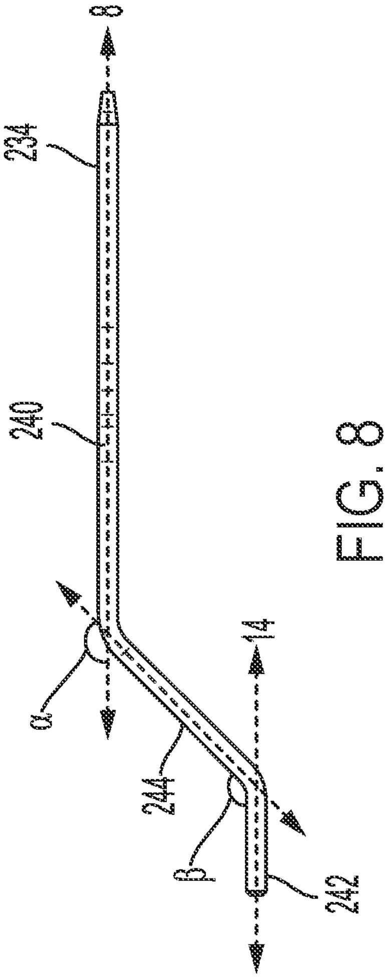
FIG. 8 is a side view of a pin of the male housing of the connector of FIG. 1.

Turning to FIGS. 6-8, in some aspects, each pin 230 can have the same pin length L1. As shown in FIG. 6, in some aspects, the pin length L1 of each first pin 232 and second pin 234 can be approximately 18.5 millimeters (mm). In some aspects, the pin length L1 of each first pin 232 and second pin 234 can be less than or equal to approximately 30 millimeters (mm). In some aspects, the pin length L1 of each first pin 232 and second pin 234 can be less than or equal to approximately 20 millimeters (mm). First pin 232 is shown in FIG. 7. First end 240 of first pin 232 can extend along a first end axis 6 and second end 242 of first pin 232 can extend along second end axis 12, as discussed above with reference to FIG. 4. In some embodiments, a single row configuration includes pins having a length of approximately 16.3 mm. In some embodiments, having a dual row of pins (and solder pads) using a single pin length L1 for each of first and second pins 232/234 allow for a single pin length, thereby simplifying manufacturing.

In some aspects, each intermediate portion 244 of first pin 232 can be generally straight, or aligned with rear side 204 of male housing 200 (FIG. 5). Accordingly, intermediate portion 244 of first pin 232 can be approximately perpendicular to first end 240 and second end 242 of first pin 232. In other words, intermediate portion 244 of first pin 232 can be approximately perpendicular to first end axis 6. Similarly, intermediate portion 244 of first pin 232 can be approximately perpendicular to second end axis 12.

Second pin 234 is shown in FIG. 8. First end 240 of second pin 234 can extend along a first end axis 8 and second end 242 of second pin 234 can extend along second end axis 14, as discussed above with reference to FIG. 4.

In some aspects, each intermediate portion 244 of second pin 234 can be oblique, or at a non-perpendicular angle relative to first end 240 and second end 242 of second pin 234. Accordingly, intermediate portion 244 of second pin 234 can be at a non-perpendicular angle relative to first end 240 and second end 242 of second pin 234. In other words, intermediate portion 244 of second pin 234 can be at a non-perpendicular angle α relative to first end axis 8, shown in FIG. 8. In some aspects, angle α can be between approximately 90 degrees and approximately 150 degrees, such as between approximately 110 degrees and approximately 130 degrees, such as approximately 120 degrees. Similarly, intermediate portion 244 of second pin 234 can be at a non-perpendicular angle β relative to second end axis 14. In some aspects, angle β can be between approximately 90 degrees and approximately 150 degrees, such as between approximately 110 degrees and approximately 130 degrees, such as approximately 120 degrees.

With reference to FIGS. 7-8, in some aspects, angle α and angle β can be the same. In some aspects, angle α can be larger than the angle between intermediate portion 244 of first pin 232 and first end axis 6. In some aspects, angle β can be larger than the angle between intermediate portion 244 of first pin 232 and second end axis 12.

In some aspects, the outward extension of second end 242 of each second pin 234 described with reference to FIG. 5 can be because of each intermediate portion 244 of second pin 234 being bent to a lesser extent than each intermediate portion 244 of first pin 232. Additionally or alternatively, in some aspects, the outward extension of second end 242 of each second pin 234 can be because of second distance D2 being greater than first distance D1.

Figure 9:
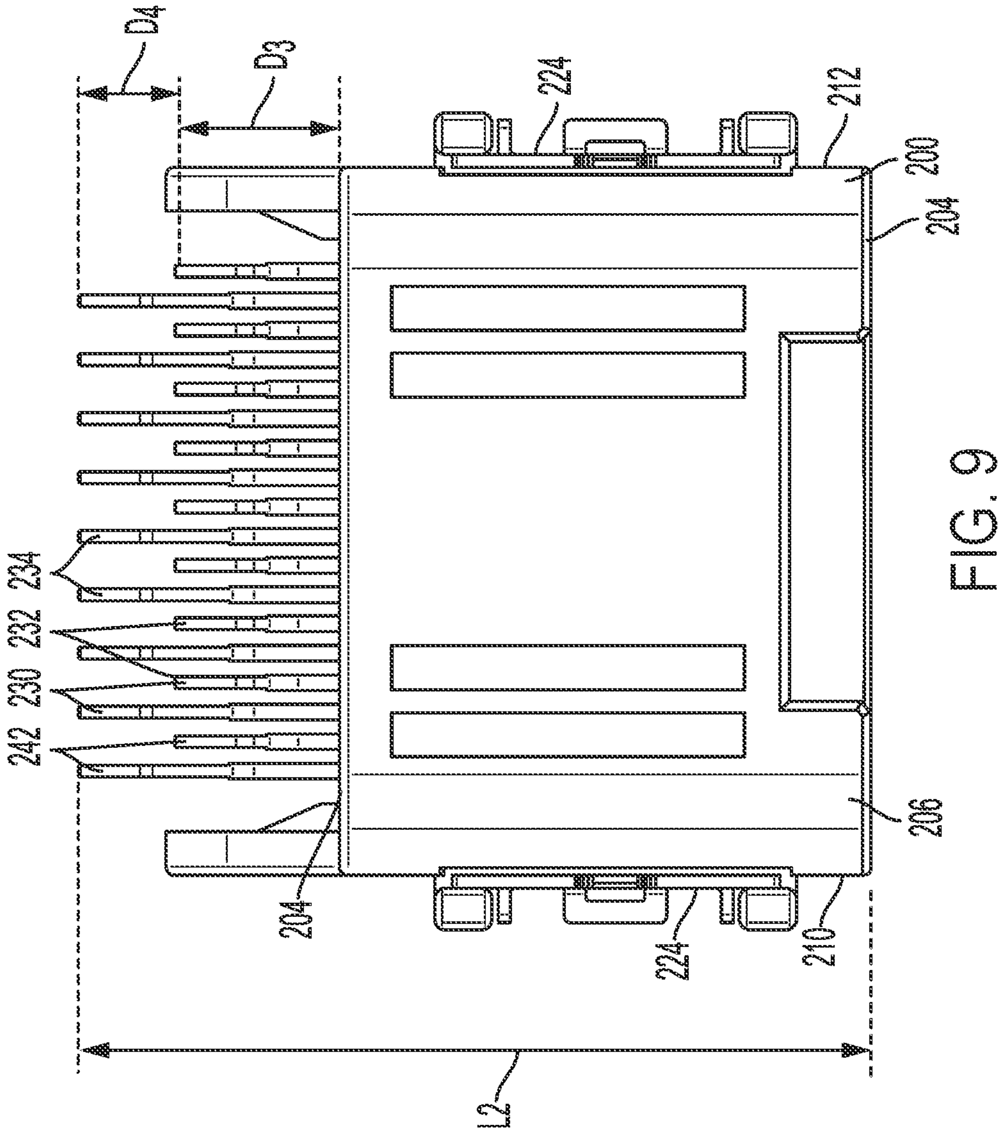
FIG. 9 is a top view of the male housing of the connector of FIG. 2.

Second end 242 of each second pin 234 being outward of second end 242 of each first pin 232 is also shown in FIG. 9. As shown, in some aspects, second ends 242 of first pins 232 can be at a first distance D3 from rear side 204. In some aspects, second ends 242 of second pins 234 can be at a fourth distance D4 from rear side 204. In some aspects, distance D3 can be less than distance D4.

In some aspects, connector 10 can facilitate forming a dual row of solder pads on a PCB by having second end 242 of each second pin 234 be outward of second end 242 of each first pin 232. In this way, isolation of the pins on the PCB side of the connector increases creepage distance in some aspects. As shown, connector 10 can have a length L2. In some aspects, length L2 can be between approximately 30 mm and approximately 45 mm, such as between approximately 35 mm and approximately 40 mm, such as approximately 37.6 mm.

Figure 10:
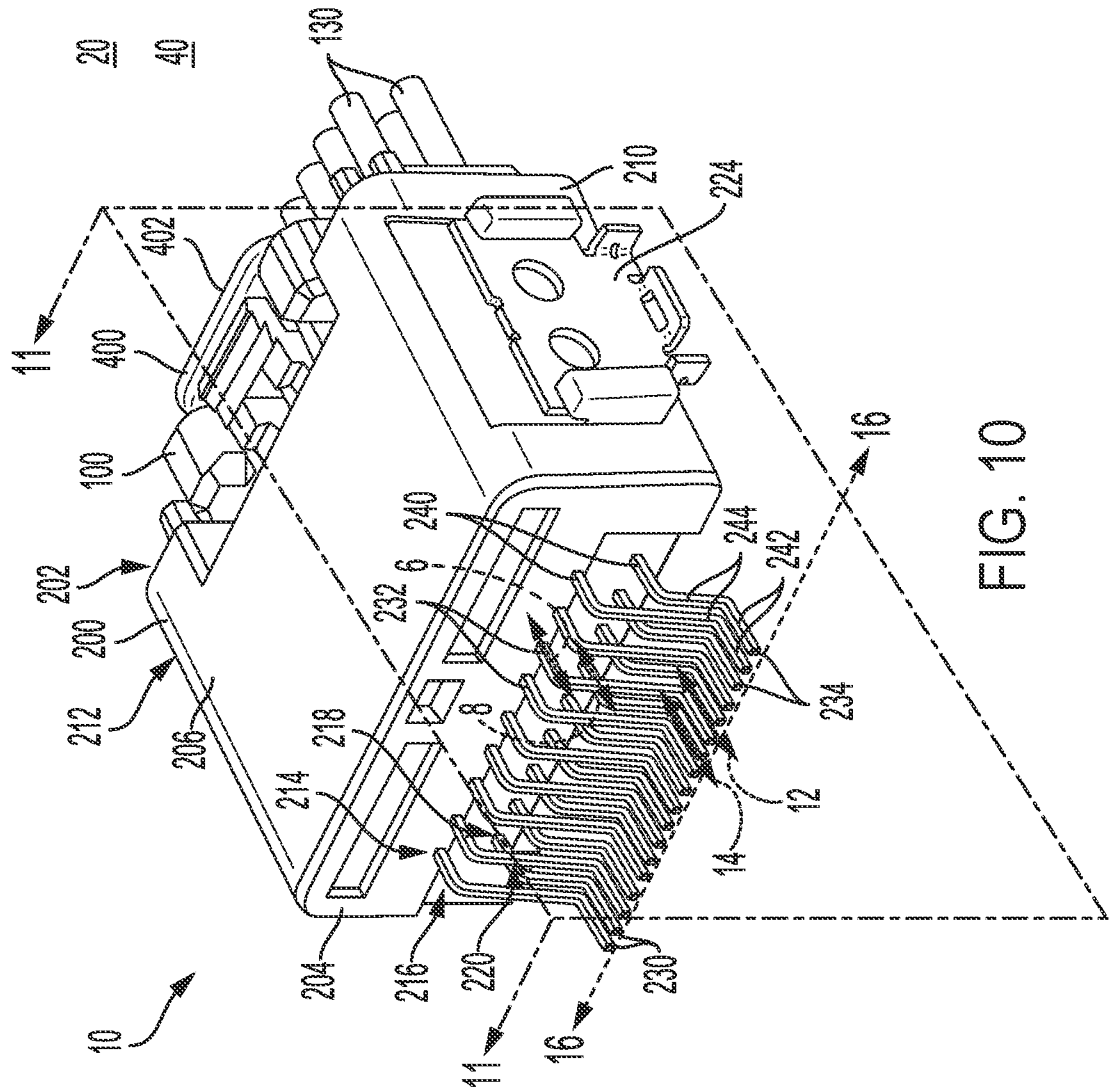
FIG. 10 is a perspective view of a connector according to various aspects.

Instead of being oblique, in some aspects, each intermediate portion 244 of first pin 232 can be generally straight, or aligned with rear side 204 of male housing 200, as shown in FIG. 10. Accordingly, intermediate portion 244 of first pin 232 can be approximately perpendicular to first end 240 and second end 242 of first pin 232. In other words, intermediate portion 244 of first pin 232 can be approximately perpendicular to first end axis 6. Similarly, intermediate portion 244 of first pin 232 can be approximately perpendicular to second end axis 12. In addition, in some aspects, each intermediate portion 244 of second pin 234 can be generally straight, or aligned with rear side 204. Accordingly, intermediate portion 244 of second pin 234 can be approximately perpendicular to first end 240 and second end 242 of second pin 234. In other words, intermediate portion 244 of second pin 234 can be approximately perpendicular to first end axis 8. Similarly, intermediate portion 244 of second pin 234 can be approximately perpendicular to second end axis 14.

Figure 11:
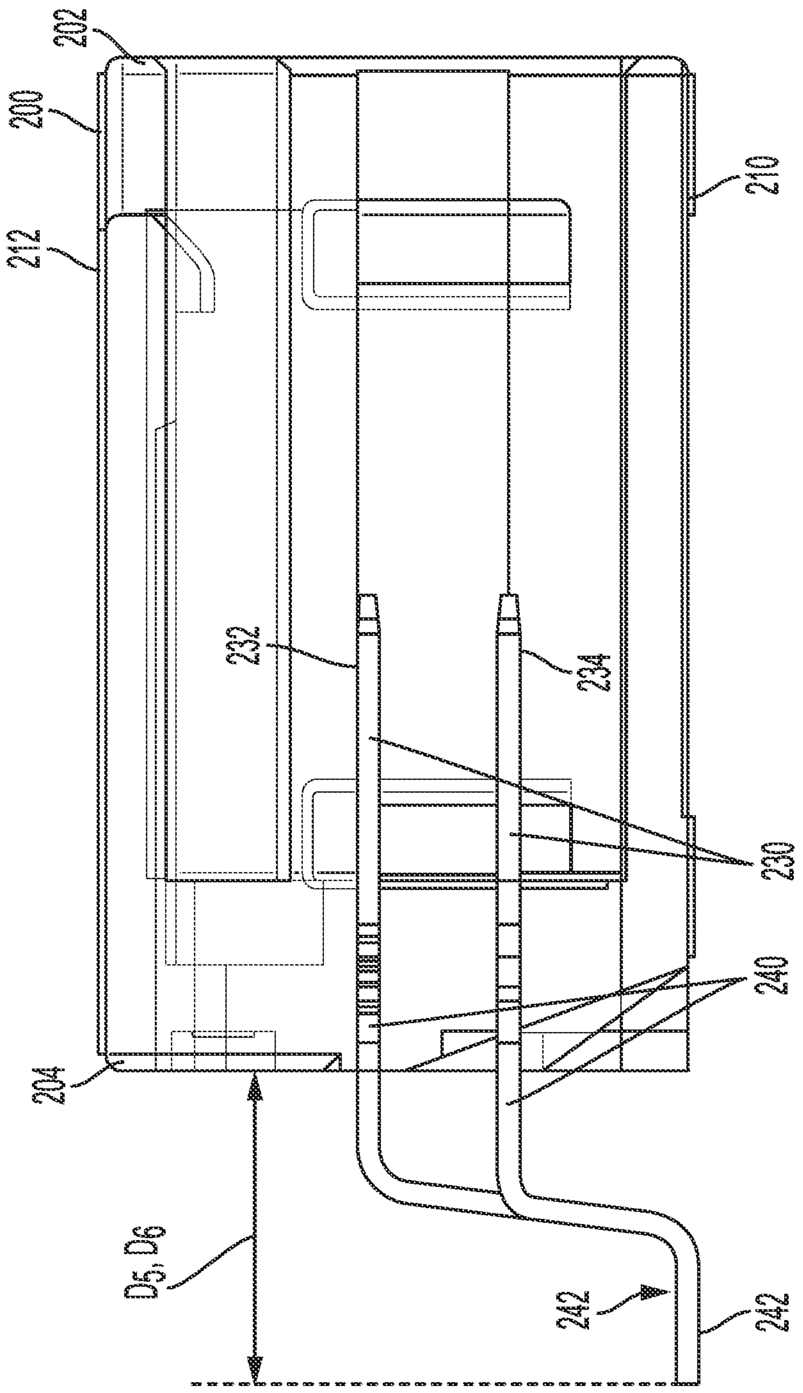
FIG. 11 is a side cross-sectional view of the connector of FIG. 10 along plane 11-11.

In addition, instead of having the same pin length, first pins 232 and second pins 234 can have different pin lengths. With reference to FIGS. 10-11, in some aspects, first pins 232 can have a first pin length and second pins 234 can have a second pin length that is less than the first pin length.

In some aspects, each first pin 232 and second pin 234 can have different pin lengths such that second ends 242 of first pins 232 and second pins 234 are aligned relative to rear side 204 of male housing 200. In some aspects, second ends 242 of first pins 232 and second pins 234 can be aligned in a single row along an axis 16 such that second ends 242 of second pins 234 are not outward of second ends 242 of first pins 232. Accordingly, second ends 242 of second pins 234 are not outward of second ends 242 of first pins 232. In some aspects, first pins 232 and second pins 234 can have different pin lengths such that second ends 242 of first pins 232 and second pins 234 can be aligned.

As shown in FIG. 11, second end 242 of each first pin 232 and second end 242 of each second pin 234 can be aligned relative to rear side 204. In some aspects, the alignment of second end 242 of each second pin 234 can be because of each intermediate portion 244 of second pin 234 being bent to approximately the same extent as each intermediate portion 244 of first pin 232. As shown, in some aspects, second ends 242 of first pins 232 can be at a first distance D5 from rear side 204. In some aspects, second ends 242 of second pins 234 can be at a fourth distance D6 from rear side 204. In some aspects, distance D5 can be approximately the same as distance D6. In some aspects, the alignment of second end 242 of each first pin 232 and second pin 242 can support forming a single row of solder pads, such that a single row of solder pads is used with the first/second pin configuration.

Figure 12:
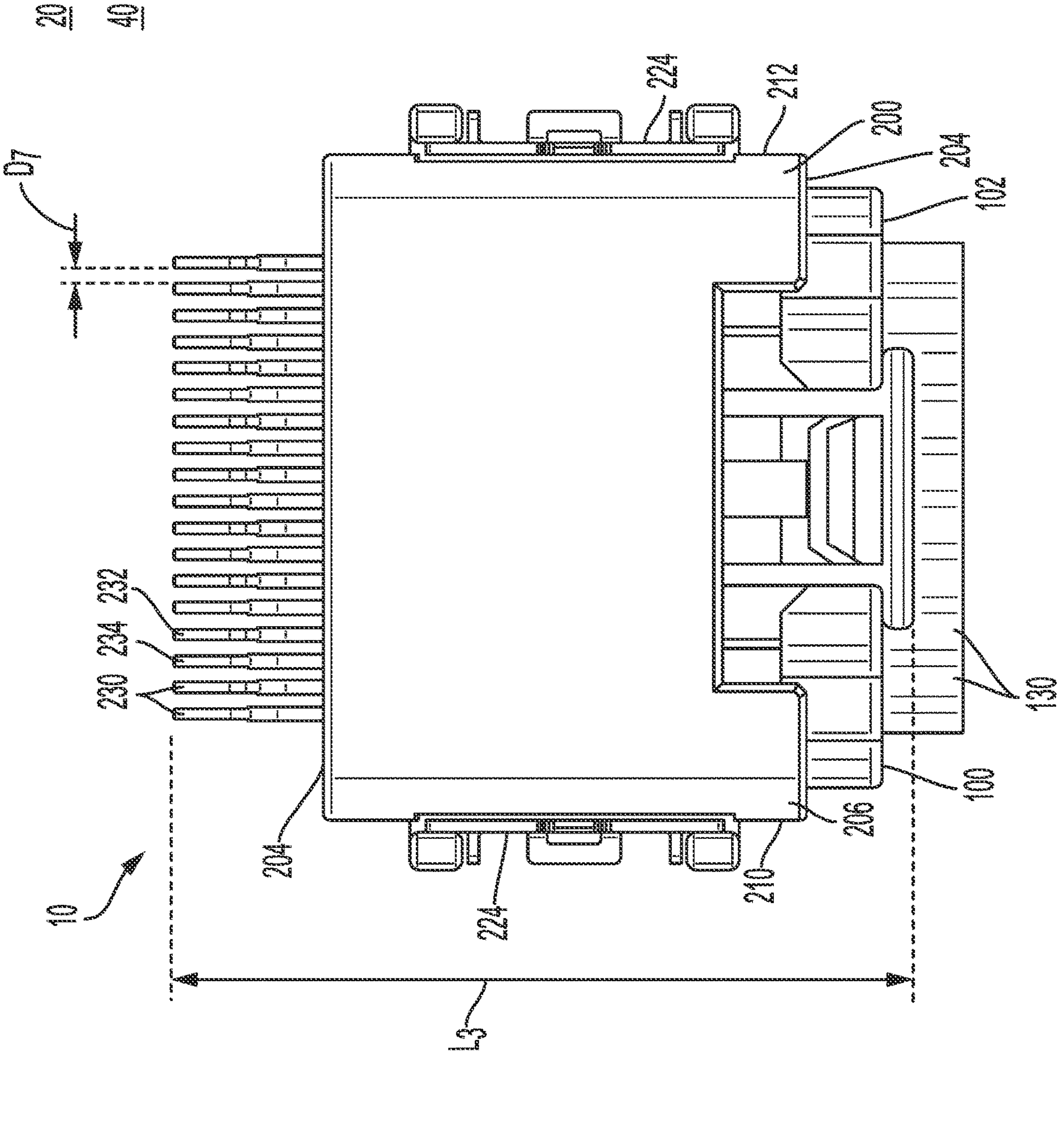
FIG. 12 is a top view of the connector of FIG. 10.

In some aspects, connector 10 can facilitate forming a single row of solder pads on a PCB by having second end 242 of each second pin 234 be aligned with second end 242 of each first pin 232, As shown in FIG. 12, connector 10 can have a length L3. In some aspects, L3 can be less than L2 (FIG. 9). In some aspects, length L3 can be between approximately 25 mm and approximately 33 mm, such as between approximately 27 mm and approximately 31 mm, such as approximately 27.75 mm.

An electrical path can extend between adjacent terminals 130, shown in FIG. 12. In some aspects, distance D7, can be a clearance or creepage for an electrical path extending from a first terminal 132 of terminals 130 to a second terminal 134 of terminals 130. In some aspects, distance D7 can be between approximately 0.4 mm and 0.8 mm, such as between approximately 0.5 mm and 0.7 mm, such as approximately 0.6 mm. Any of the aspects described herein can support this clearance or creepage distance D7.

Figure 13:
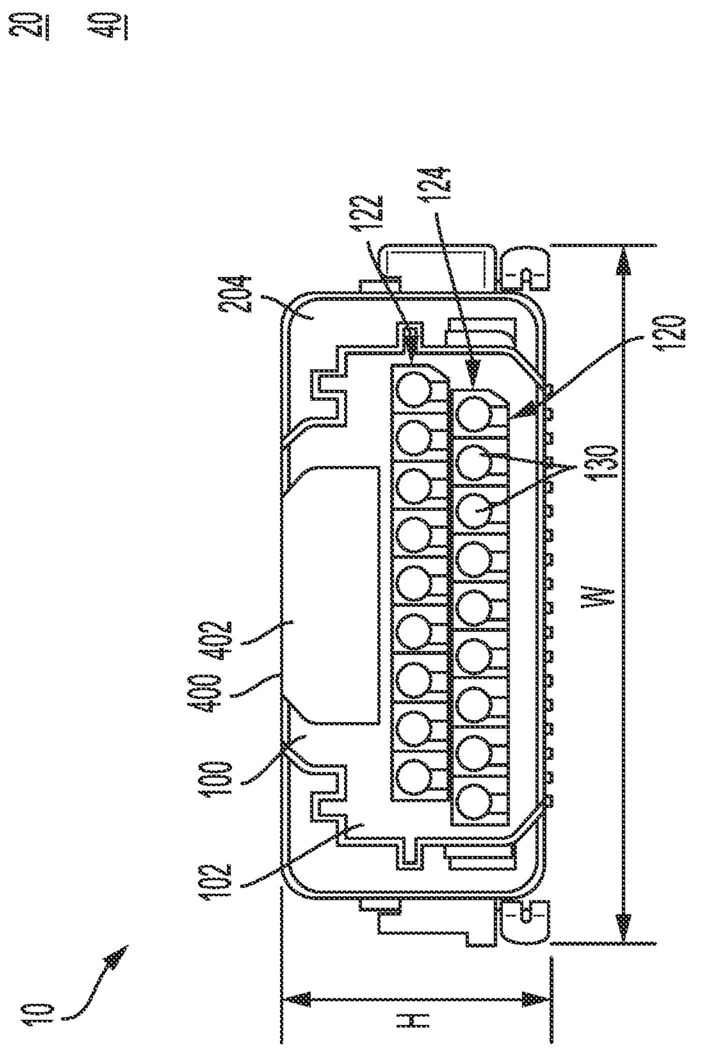
FIG. 13 is a front view of the connector of FIG. 10.

With reference to FIG. 13, connector 10 can have a low profile. In some aspects, a height H of connector 10 can be between approximately 10 mm and approximately 15 mm, such as between approximately 11 mm and approximately 13 mm, such as approximately 11.8 mm. In some aspects, a width W of connector 10 can be between approximately 25 mm and approximately 33 mm, such as between approximately 27 mm and approximately 31 mm, such as approximately 29.8 mm.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the invention that others can, by applying knowledge within the skill of the art, readily modify and/or adapt for various applications such specific aspects, without undue experimentation, without departing from the general concept of the present invention. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary aspects, but should be defined only in accordance with the following claims and their equivalents.

What is claimed is:

1. A connector, comprising:
a male housing comprising a rear side;
a plurality of first openings and a plurality of second openings formed in the rear side, the plurality of second openings being positioned below and offset from the plurality of first openings;
a plurality of pins comprising:
a plurality of first pins disposed in the plurality of first openings, each of the plurality of first pins having a pin length; and
a plurality of second pins disposed in the plurality of second openings, each of the plurality of second pins having the pin length; and
a female housing comprising a plurality of terminals to mate with the plurality of the pins.

2. The connector of claim 1, wherein the plurality of first pins are at a first angle relative to the rear side, and
wherein the plurality of second pins are at a second angle relative to the rear side, the second angle being greater than the first angle.

3. The connector of claim 1, wherein the plurality of second pins is outward of the plurality of first pins relative to the rear side.

4. The connector of claim 1, wherein the plurality of first openings is positioned above a central lateral axis of the rear side.

5. The connector of claim 1, wherein the plurality of second openings is positioned below a central lateral axis of the rear side.

6. The connector of claim 1, wherein a clearance or creepage for an electrical path extending from a first terminal of the plurality of terminals to a second terminal of the plurality of terminals is approximately 0.6 millimeters.

7. A male housing for a connector, comprising:
a bottom end having a transverse axis;
a rear side having a height;
a first opening formed in the rear side;
a second opening formed in the rear side and positioned below the first opening,
wherein the first opening is positioned above a central lateral axis of the rear side extending through a midpoint of the height, and
wherein the second opening is positioned below the central lateral axis;
a first pin having a first end and a second end, the first end of the first pin being disposed in the first opening and the second end of the first pin extending along a first axis parallel to and on the same plane as the transverse axis; and
a second pin having a first end and a second end, the first end of the second pin being disposed in the second opening and the second end of the second pin extending along a second axis parallel to and on the same plane as the transverse axis, the second end of the first pin and the second end of the second pin being aligned relative to the rear side.

8. The male housing of claim 7, wherein the first pin comprises an intermediate portion between the first end and the second end of the first pin, the intermediate portion being aligned with the rear side.

9. The male housing of claim 7, wherein the second pin comprises an intermediate portion between the first end and the second end of the second pin, the intermediate portion being aligned with the rear side.

10. The male housing of claim 7, wherein the first pin comprises a first pin length and the second pin comprises a second pin length that is less than the first pin length.

11. The male housing of claim 7, wherein the first end of the first pin extends along a third axis parallel to the transverse axis, and
wherein the first end of the second pin extends along a fourth axis parallel to the transverse axis.

12. A male housing for a connector, comprising:
a bottom end having a transverse axis;
a rear side;
a first opening formed in the rear side;
a second opening formed in the rear side;
a first pin having a first end extending along a first axis, an intermediate portion, and a second end, the intermediate portion of the first pin being at a first angle relative to the first axis; and
a second pin having a first end extending along a second axis, an intermediate portion, and a second end, the intermediate portion of the second pin being at a second angle relative to the second axis, the second angle being different from the first angle, wherein the first pin and the second pin have the same length.

13. The male housing of claim 12, wherein the second angle is greater than the first angle.

14. The male housing of claim 12, wherein the second end of the second pin is outward of the second end of the first pin relative to the rear side.

15. The male housing of claim 12, wherein the second end of the first pin and the second end of the second pin extend along axes parallel to and on the same plane as a bottom transverse axis of the male housing.

16. The male housing of claim 12, wherein the second end of the first pin extends along a third axis, wherein the intermediate portion of the first pin is at a third angle relative to the third axis, and wherein the first angle and the third angle are the same.

17. The male housing of claim 12, wherein the second opening is positioned adjacent the first opening.

18. The male housing of claim 12, wherein the first opening is positioned above a central lateral axis of the rear side, and wherein the second opening is positioned below the central lateral axis of the rear side.

* * * * *